United States Patent [19]

Troy

[11] Patent Number: 4,717,907

[45] Date of Patent: Jan. 5, 1988

[54] REMOTE PARAMETER MONITORING SYSTEM WITH LOCATION-SPECIFIC INDICATORS

[75] Inventor: Stephen R. Troy, Severna Park, Md.

[73] Assignee: Arinc Research Corporation, Annapolis, Md.

[21] Appl. No.: 837,961

[22] Filed: Mar. 10, 1986

[51] Int. Cl.[4] ........................ G01M 5/00; B64C 27/04

[52] U.S. Cl. .................................... 340/544; 340/511; 340/513; 340/533; 244/17.11; 416/61

[58] Field of Search ............... 340/544, 511, 513, 533, 340/626; 244/17.11; 416/61

[56] References Cited

U.S. PATENT DOCUMENTS

| | | | |
|---|---|---|---|
| 3,547,555 | 12/1970 | Jensen | 416/61 |
| 3,691,820 | 9/1972 | Fiore | 416/61 |
| 3,739,376 | 6/1973 | Keledy | 416/61 |
| 3,981,611 | 9/1976 | Jensen | 416/61 |
| 3,985,318 | 10/1976 | Dominey et al. | 340/626 |
| 4,181,024 | 1/1980 | Leak et al. | 73/660 |
| 4,346,321 | 8/1982 | Frister | 310/232 |
| 4,491,828 | 1/1985 | Galvin et al. | 340/511 |
| 4,524,349 | 6/1985 | Hyatt | 340/511 |
| 4,524,620 | 6/1985 | Wright et al. | 416/61 |
| 4,549,168 | 10/1985 | Sieradzki | 340/511 |
| 4,612,534 | 9/1986 | Buehler et al. | 340/511 |

*Primary Examiner*—Howard A. Birmiel
*Attorney, Agent, or Firm*—Parkhurst & Oliff

[57] ABSTRACT

A remote parameter monitoring system utilizes a series of half-wave rectifier diodes in combination with a unique overlapping wiring arrangement to provide for location-specific detection of a parameter condition existing at a plurality of spaced locations. In one embodiment of the invention, the system is used for monitoring cracks in helicopter rotor blades and indicating to the crew in the cockpit both the fact of a cracked blade and the specific blade which is cracked. In such embodiment, the system includes a three-phase alternating current transformer whose primary windings are supplied by the helicopter's three-phase alternating current generators and whose secondary windings make up part of the wiring loops between the cockpit and the rotor blades. By controlling currents flowing in opposite directions in the wiring loops, the system allows for blade-specific crack detection of up to six rotor blades by means of only three wires between the rotor blade assembly and the cockpit area.

18 Claims, 2 Drawing Figures

REMOTE PARAMETER MONITORING SYSTEM WITH LOCATION-SPECIFIC INDICATORS

BACKGROUND OF THE INVENTION

The present invention relates to systems for monitoring a parameter at remote, inaccessible locations, and particularly to such systems which detect cracks in helicopter rotor blades. Even more particularly, the invention relates to such systems having the capability of indicating to a second location (e.g., a cockpit) not only the fact of a sensed condition (e.g., such as a blade crack) but also the specific location of the sensed condition (e.g., a crack).

There are many applications wherein it is essential that a selected parameter at a remote location be continuously monitored and a warning provided whenever the monitored parameter varies above or below a predetermined limit. One example is helicopter rotor blades which are subject to cracks or other mechanical flaws that threaten the structural integrity of the blades. Such cracks and other flaws begin in small localized areas of the rotor blades, and are usually not immediately visible to the naked eye. Thus, to avoid hazard to the helicopter crew and passengers, it is essential to detect such cracks and flaws at their outset.

There are known in the prior art essentially two types of helicopter rotor blade crack monitoring systems which have been developed in response to the above need. The first type of system is one which utilizes a combination pressure transducer/ radiation source on each of the helicopter blades along with a radiation detector mounted in an opposed position on the body of the helicopter. The blades are pressurized, and as long as the correct pressure is detected by the pressure transducer, no radiation signal is transmitted. Upon detection of blade pressure above or below a predetermined level, the transducer/radiation source transmits a signal to the radiation detector thereby triggering a warning indicator inside the cockpit. This type of system is represented by U.S. Pats. Nos. 3,985,318 and 3,739,376 to Dominey et al. and Keledy, respectively. As is evident from a review of Keledy, this type of system has been adapted to provide the cockpit with both an indication of the fact of a crack and the specific blade which is cracked.

The second type of blade crack monitoring system is the direct-wired system represented by U.S. Pat. No. 3,981,611 to Jensen, an embodiment of which is depicted in schematic form in FIG. 1 of the drawings herein. In this type of system, the hollow helicopter blades are similarly pressurized with dry nitrogen gas or some other gaseous product. As depicted in FIG. 1, the blades of the helicopter are fitted with pressure transducers/switches 1*a–f*, whose electrical contacts are kept in a normally open position by the gas pressure. Upon the occurrence of a crack in one of the rotor blades, the gas pressure in that blade varies, thus allowing the switch in that blade's particular pressure transducer/switch to close. Closing of the pressure switch provides a ground path for voltage source 2 through relay coil 3. Energization of relay coil 3 causes relay wiper 4 to close thereby lighting a warning lamp 5 in the helicopter's cockpit, alerting the helicopter crew to the fact of a faulty helicopter blade. In this type of system, electrical connections are made between the spinning rotor blade assembly and the stationary rotor mast via slip rings 6*a–c*.

As is evident, the latter type system has distinct advantages over the former type system in terms of simplicity of construction and overall cost effectiveness. However, unlike the radiation source/detector type system first discussed, the latter type system has not been adapted to provide to the cockpit crew an indication of both the fact of a blade crack and an indication of the specific blade which is cracked. Thus, until now, the latter system has been less desirable. The existing system of FIG. 1 could be modified to provide a separate circuit from each rotor blade to the cockpit, thereby providing the capability of isolating the faulty blade; however, this would require extensive additional wiring and slip rings, thus substantially increasing both cost and potential for mechanical and electrical failures.

SUMMARY OF THE INVENTION

Accordingly, the present invention has been developed to overcome the shortcomings of conventional direct-wired parameter monitoring systems, and to provide an improved direct-wired remote parameter monitoring system which indicates both the fact of a parameter condition and the location of such parameter condition, without the need for individualized wiring between each monitoring location and the location of the warning indicators.

It is therefore an object of the invention to provide an improved and more versatile direct-wired remote parameter monitoring system usable for helicopter blade crack monitoring.

It is yet another object of the invention to provide a direct-wired remote parameter monitoring system wherein both the fact of and location of a parameter condition are indicated.

It is still a further object of the invention to provide such an improved direct-wired remote parameter monitoring system which is simple in construction and cost effective.

Thus, in accordance with one aspect of the present invention, the shortcomings of the prior art are overcome by a remote parameter monitoring system which is usable, inter alia, as a helicopter rotor blade crack monitoring system, and which indicates both the fact and location of a parameter condition. The system includes condition responsive switches for at least two spaced locations for producing an output in response to a predetermined condition of at least one parameter. The switches are wired to warning indicators, a source of power, and gating elements in such a manner that the output of a particular switch is correlated to a corresponding warning indicator response which identifies both the existence of the output and the particular switch which is producing the output.

In accordance with another aspect of the invention, the system utilizes a multi-phase alternating current transformer in combinatio with a plurality of overlapping wire loops equal in number to one-half the number of locations to be monitored.

In accordance with yet another aspect of the invention, the gating elements comprise half-wave rectifier diodes in series with respective switches and warning indicators such that current flowing in one direction in a wire loop is made to flow through one switch and corresponding warning indicator, and current flowing in a second direction in such wire loop is made to flow through a second switch and corresponding indicator.

Still further aspects of the invention include the use of pressure transducers/switches for monitoring pressure, the use of warning lamps as the warning indicators, and the use of voltage sensitive diodes in series with the warning indicators to regulate voltage.

These and other features and advantages of the invention are described in or apparent from the following detailed description of a preferred embodiment.

BRIEF DESCRIPTION OF THE DRAWINGS

The preferred embodiment is described with reference to the drawings, in which.

DESCRIPTION OF THE PREFERRED EMBODIMENT

Figure 1:
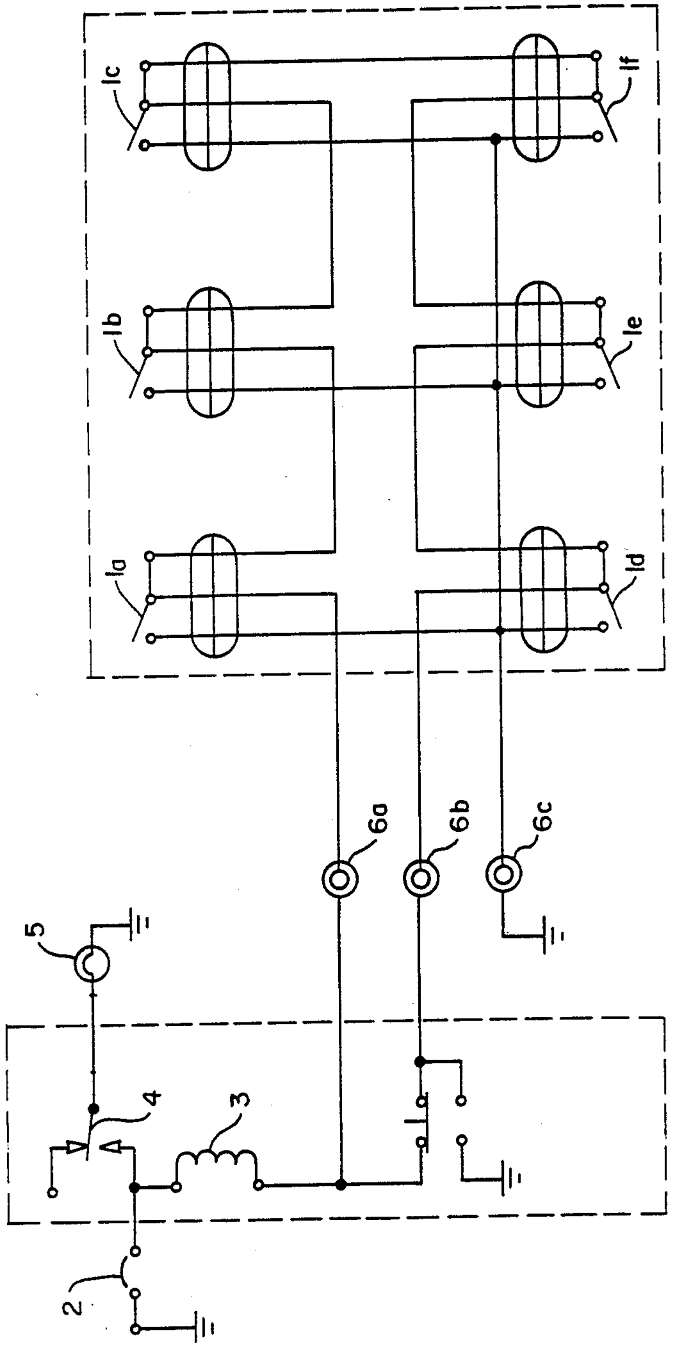
FIG. 1 is a schematic diagram of a conventional direct-wired remote parameter monitoring system.
Figure 2:
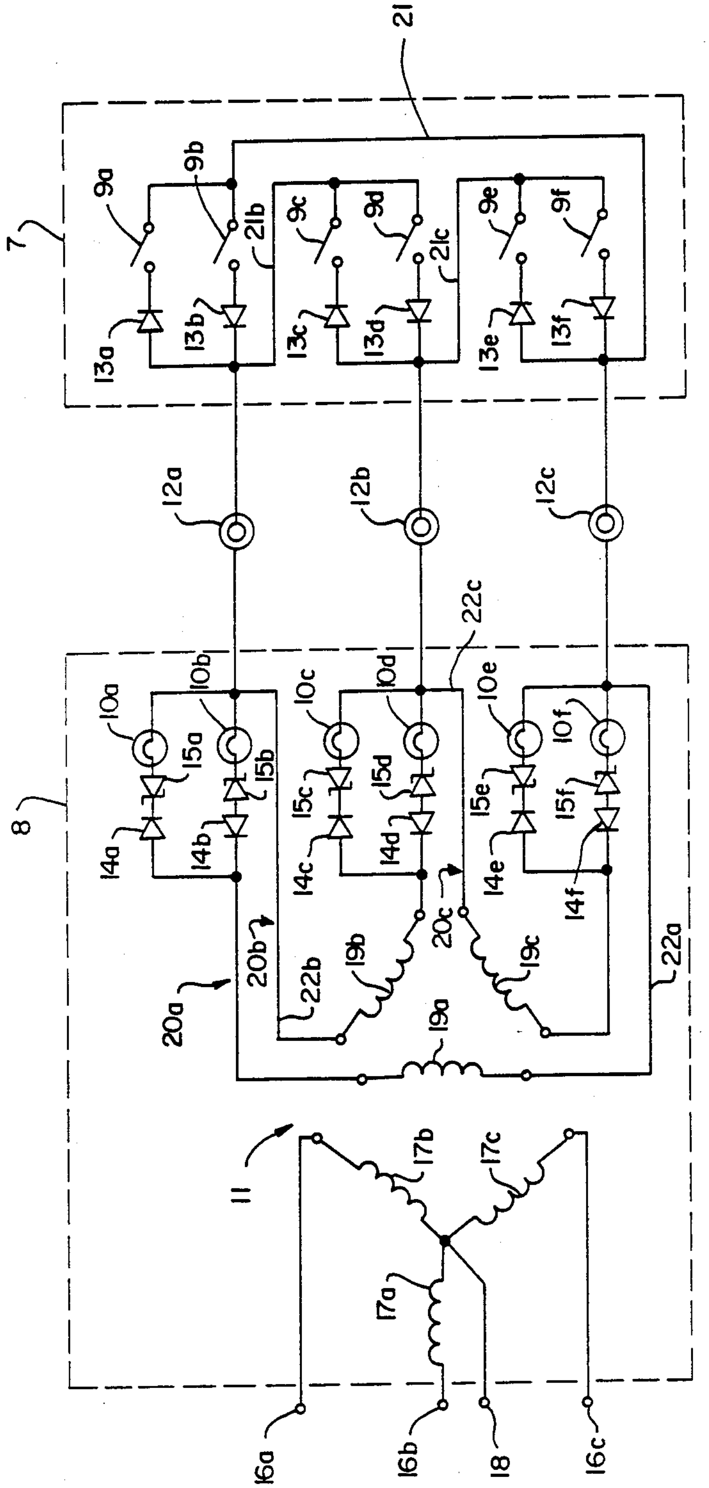
FIG. 2 is a schematic diagram of the direct-wired remote parameter monitoring system of the present invention.

Referring to FIG. 2 of the drawings, a remote parameter monitoring system constructed in accordance with the present invention for cockpit monitoring of both the fact and specific location of helicopter rotor blade cracks will now be described.

A rotor blade assembly 7 (schematically shown) comprising a plurality of rotor blades is connected to a shaft which is further connected to the aircraft structure 8 (schematically shown) through a stationary rotor mast and associated shaft rotating apparatus. This provides for rotation of the rotor blade assembly 7 relative to the aircraft structure 8. The rotor blades, shaft, rotor mast and associated rotating apparatus are not shown as they do not form a part of the invention and will be otherwise fully appreciated by those of ordinary skill in the art.

Each rotor blade of the helicopter is hollow, and such hollow space is pressurized with dry nitrogen gas or other similar gaseous product both for corrosion inhibiting purposes and for purposes of blade crack monitoring to be described herein. The hollow rotor blades of the helicopter are fitted with pressure transducers/switches 9*a–f*, whose electrical contacts are kept in a normally open position by the gas pressure. Upon the occurrence of a blade crack, the pressurized gas leaks out of the hollow rotor blade thereby causing the corresponding pressure transducer/switch 9*a–f*, a corresponding warning lamp 10*a–f* lights in the cockpit thereby alerting the crew to the fact of a crack in the particular blade corresponding to the particular illuminated warning lamp. It will be appreciated that the pressure transducers/switches 9*a–f* may be single packaged components mounted on the rotor blades or may consist of transducers mounted on the rotor blades and connected to associated switches located elsewhere on the aircraft such as in the hub of the rotor blade assembly.

The specific circuitry and operation of the helicopter embodiment of the remote parameter monitoring system of the instant invention will now be described with reference to Figure 2. A three-phase transformer 11 is utilized in conjunction with the three-phase alternating current produced by the helicopter's electrical generators to create three overlapping current loops (one per phase), each of which current loops services two blades of a six blade helicopter via the slip rings 12*a–c*. Half-wave rectifier diodes 13*a–f* in the rotor blade assembly, and half-wave rectifier diodes 14*a–f* in the cockpit, are used as gating elements to divide each of the three overlapping current loops into two half-wave rectified currents flowing in opposite directions. Thus, in effect, six current loops are carried between the cockpit and the the rotor blade assembly by means of only three wires via only three slip rings 12*a–c*. Voltage sensitive diodes 15*a–f*, such as, for example, Zener diodes or silicon trigger diodes, are also utilized in the cockpit area in series with the half-wave rectifier diodes 14*a–f* and the warning lamps 10*a–f* to regulate the load voltage against variations in load current, thereby maintaining a bright, steady illuminatio by the warning lamps upon the occurrence of a blade crack.

The helicopter's electrical generators produce a threephase alternating current at input leads 16*a–c*. This produces voltages across primary windings 17*a–c* with respect to neutral lead 18 which are typically 120° out of phase with respect to one another. Each of primary windings 17*a–c* is associated with a corresponding secondary winding 19*a–c* n the three-phase transformer 11 to induce a flow of current through such secondary windings and corresponding wire loops upon the occurrence of a closed circuit in such wire loops.

Using current loop 20*a* in exemplary fashion, it can be seen that if pressure transducer/switch 9*a* closes upon development of a crack in the corresponding rotor blade, a closed circuit develops thereby permitting the induction of a current in secondary winding 19*a* of current loop 20*a*. Due to the juxtaposition of half-wave rectifier diodes 13*a* and 14*a*, the current flows in a clockwise direction vis-a-vis FIG. 2. Thus, the current flows from secondary winding 19*a* through half-wave rectifier diode 14*a*, voltage sensitive diode 15*a*, warning lamp 10*a*, slip ring 12*a*, half-wave rectifier diode 13*a*, pressure switch 9*a*, wire 21*a*, slip ring 12*c*, and wire 22*a* back to secondary winding 19*a*. thus, warning lamp 10*a* lights thereby notifying the crew in the cockpit that the rotor blade corresponding to pressure switch 9*a* has developed a crack. On the other hand, if the rotor blade corresponding to pressure switch 9*b* develops a crack thereby closing pressure switch 9*b*, a closed circuit is again formed. However, in this instance, because of the juxtaposition of half-wave rectifier diodes 13*b* and 14*b*, current in wire loop 20*a* will now travel in the counterclockwise direction vis-a-vis FIG. 2 of the drawings. Thus, current flows from secondary winding 19*a* through wire 22*a*, slip ring 12*c*, wire 21*a*, pressure switch 9*b*, half-wave rectifier diode 13*b*, slip ring 12*a*, warning lamp 10*b*, voltage sensitive diode 15*b*, half-wave rectifier diode 14*b*, and back to secondary winding 19*a*. Thus, current flowing through warning lamp 10*b* illuminates the warning lamp to notify the crew in the cockpit that the rotor blade corresponding to pressure switch 9*b* has developed a crack.

The operation of wire loops 20*b* and 20*c* is identical to that of the above-described operation of wire loop 20*a*, with reference to corresponding and like-numbered elements of such additional wire loops. As is apparent from FIG. 2, each of the slip rings 12*a–c* and the associted wire connecting the rotor blade assembly 7 to the aircraft structure 8 is common to two of the three wire loops depicted in FIG. 2.

In accordance with the above, it can be seen that an improved and versatile direct-wired remote parameter monitoring system can be constructed and configured to provide for blade-specific identification of cracks developing in up to six rotor blades of a helicopter through the use of just three wires running via three slip rings between the rotor blade assembly and the aircraft structure. The improved system thus increases helicopter crew confidence, and improves fault isolation, thereby reducing helicopter down time, maintenance manhours and support costs. Additionally, since the improved system operates with balanced current loops, rather than providing a ground path through the helicopter, short circuits to ground due to wire chafing, worn insulation, etc., as often occurs in aircraft, will have no effect on the improved system. In other words, such shorts to ground which in the existing direct-wired system produce false alarms and associated unnecessary precautionary landings, helicopter down time, and maintenance, will not have such effects in the improved system of the instant invention. Finally, because of improved reliability of the overall blade crack monitoring system, including individual warning indicators and partially separated wiring loops for individual rotor blades, the system reduces potential wear and tear on warning lamps, connectors, slip rings, and other components of the system.

Obviously, many modifications and variations to the instant remote parameter monitoring system are possible in light of the above teachings. It is therefore to be understood that, within the scope of the appended claims, the invention may be practiced otherwise than as specifically described. For example, although the most widely used multi-phase power form is the prescribed three-phase alternating current in which the phase voltages are separated by 120°, it will be evident that the principles embodied in this inventio can also be utilized with systems using power forms of other numbers of phases. Thus, additional rotor blades could be monitored with additional phase voltage. Furthermore, while the preferred embodiment prescribes half-wave rectifier diodes in the rotor blade assembly and cockpit for dividing alternating current into two half-wave rectified currents flowing in opposite directions, the same function might be performed by other electrical components accomplishing this same bridging/blocking or gating effect. Finally, other components may be substituted for accomplishing the voltage regulation function of the voltage sensitive diodes, the notification functions of the warning lamps (e.g., sirens, buzzers, pressure guages, etc.), and others of the various parts of the improved remote parameter monitoring system.

Furthermore, as discussed above, it should be recognized that the monitoring system of the present invention may find usage in monitoring other parameters in other types of applications where faults at inaccessible or remote locatios mut be detected and specifically identified. For example, the sensed parameter might be temperature rather than pressure, or the monitoring system might be applied to detect inadequate pressure in one of the numerous tires of a truck to prevent overloading of other tires and the corresponding potential consequantial hazard resulting therefrom.

Thus, while only one embodiment of the invention has been specifically described herein, it will be apparent that numerous modifications may be made theein without departing from the spirit and scope of the invention.

What is claimed is:

1. A system for monitoring at least one parameter at at least two spaced locations, said system comprising:

alternating current power means;

condition responsive switching means for each one of said at least two spaced locations for producing an output in response to a predetermined condition of said at least one parameter;

means situated at a remote location from said at least two spaced locations for indicating the existence of said output from each said switching means;

means for electrically connecting said switching means to said indicating means and said power means, said electrical connecting means comprising at least two overlapping wire loops each serving at least two switching means, a first leg of each wire loop connecting the power means to indicating means corresponding respectively with said at least two switching means, a second leg of each wire loop connecting said at least two switching means to their respective corresponding indicating means, and a third leg of each wire loop connecting said at least two switching means with the power means, wherein the second leg of each wire loop serves as the third leg of another of the wire loops; and gating means further electrically connected by said electrical connecting means to said switching means, indicating means and power means for correlating the output of a particular switching means to a corresponding particular response by said indicating means;

whereby upon an output from a particular switching means in response to a predetermined condition of said parameter at one of said spaced locations, the indicating means identifies both the existence of said output and the particular switching means producing said output.

2. The parameter monitoring system of claim 1, wherein each wire loop serves two switching means and wherein said gating means comprises at least one gating element in each wire loop, said gating element permitting current flowing in a first direction in each wire loop to flow through one of said two switching means and its corresponding indicating means, and permitting current flowing in a second direction in each wire loop to flow through the other of said two switching means and its corresponding indicating means.

3. The parameter monitoring system of clain 2, wherein said at least one gating element in each wire loop comprises four half-wave rectifier diodes, two of said diodes being connected in series respectively with one of said two switching means and its corresponding indicating means to permit flow therethrough os current flowing in a first direction, and the other two of said diodes being connected in series respectively with the other of said two switching means and its corresponding indicating means to permit flow therethrough of current flowing in a second direction.

4. The parameter monitoring system of claim 3, wherein said power means comprises a multi-phase alternating current transformer, a different one of the secondary windings of the transformer being connected to each of said wire loops.

5. The parameter monitoring system of claim 3, wherein said switching means comprises pressure transducers in combination with electrical switches responsive thereto.

6. The parameter monitoring system of claim 3, wherein said indicating means comprises warning lamps.

7. The parameter monitoring system of claim 3, further comprising at least one voltage sensitive diode in series with each said indicating means.

8. A system for monitoring pressure in the pressurized hollow rotor blades of a helicopter, said system comprising:

a multi-phase alternating current transformer;

a plurality of pressure transducers respectively mounted on, and adapted to detect the pressure within, said hollow rotor blades;

a plurality of switching means respectively connected to said plurality of pressure transducers, each of which plurality of switching means produces an output in response to a predetermined pressure detected by th pressure transducer to which said each switching means is connected;

a plurality of indicating means at a location remote from the rotor blades of the helicopter and corresponding respectively with said plurality of switching means for indicating the existence of said output from each said switching means;

a plurality of overlapping wire loops equal in number ot one-half the number of helicopter rotor blades to be monitored, a first leg of each wire loop connecting a first lead of a secondary winding of the transformer to indicating means corresponding respectively with two of said plurality of switching means, a second leg of each wire loop connecting said two switching means to their respective corresponding indicating means, and a third leg of each wire loop connecting said two switching means with a second lead of said secondary winding of the transformer, wherein the second leg of each wire loop serves as the third leg of another of the wire loops; and a first pair of half-wave rectifier diodes connected in each wire loop in series respectively with one of said two switching means and its corresponding indicating means, and a second pair of half-wave rectifier diodes connected in each wire loop in series respectively with the other of said two switching means and its corresponding indicating means, said diodes permitting current flowing in a first direction in each wire loop to flow through one of said two switching means and its corresponding indicating means, and permitting current flowing in a second direction in each wire loop to flow through the other of said two switching means and its corresponding indicating means;

whereby upon an output from a particular switching means in response to a predetermined pressure in a rotor blade, an indicating means corresponding with said particular switching means and rotor blade is triggered thereby identifying both the existence of said output and the particular switching means producing said output.

9. The pressure monitoring system of claim 8, wherein said plurality of indicating means comprises a plurality of warning lamps.

10. The pressure monitoring system of claim 8, further comprising at least one voltage sensitive diode in series with each said indicating means.

11. A system for monitoring at least one parameter at the rotor blades of a helicopter, said system comprising:

alternating current power means;

conditio responsive switching means for each one of said rotor blades for producing an output in response to a predetermined condition of said at least one parameter;

means situated at a remote location from said rotor blades for indicating the existence of said output from each said switching means;

means for electrically connecting said switching means to said indicating means and said power means;

gating means further electrically connected by said electrical connecting means to said switching means, indicating means and power means for correlating the output of a particular switching means to a corresponding particular response by said indicating means;

whereby upon an output from a particular switching means in response to a predetermined condition of said parameter at one of said rotor blades, the indicating means identifies both the existence of said output and the particular switching means producing said output.

12. The parameter monitoring system of claim 11, wherein said electrical connecting means comprises at least two overlapping wire loops each serving at least two switching means, a first leg of each wire loop connecting the poweor means to indicating means corresponding respectively with said at least two switching means, a second leg of each wire loop connecting said at least two switching means to their respective corresponding indicating means, and a third leg of each wire loop connecting said at least two switching means with the power means, wherein the second leg of each wire loop serves as the third leg os another of the wire loops.

13. The parameter monitoring system of claim 12, wherein each wire loop serves two switching means and wherein said gating means comprises at least one gating element in each wire loop, said gating element permitting current flowing in a first direction in each wire loop to flow through one of said two switching means and its corresponding indicating means, and permitting current flowing in a second direction in each wire loop to flow through the other of said two switching means and its corresponding indicating means.

14. The parameter monitoring system of claim 13, wherein said at least one gating element in each wire loop comprises four half-wave rectifier diodes, two of said diodes being connected in series respectively with one of said two switching means and its corresponding indicating means to permit flow therethrough of current flowing in a first direction, and the other two of said diodes being connected in series respectively with the other of said two switching means and its corresponding indicating means to permit flow therethrough of current flowing in a second direction.

15. The parameter monitoring system of claim 14, wherein said power means comprises a multi-phase alternating current transformer, a different one of the secondary windings of the transformer being connected to each of said wire loops.

16. The parameter monitoring system of claim 14, wherein said switching means comprises pressure transducers in combination with electrical switches responsive thereto.

17. The parameter monitoring system of claim 14, wherein said indicating means comprises warning lamps.

18. The parameter monitoring system of claim 14, further comprising at least one voltage sensitive diode in series with each said indicating means.

* * * * *